United States Patent [19]

Oliver et al.

[11] 4,146,910

[45] Mar. 27, 1979

[54] COMBINED SPEED CONTROL AND SECTORING INDEX FOR DISC RECORDERS AND THE LIKE

[75] Inventors: Theodore A. Oliver; Neal E. Foxworthy, both of Ann Arbor, Mich.

[73] Assignee: Sycor, Inc., Ann Arbor, Mich.

[21] Appl. No.: 789,528

[22] Filed: Apr. 21, 1977

[51] Int. Cl.² .................... G11B 15/54; G11B 15/18; G05B 19/28
[52] U.S. Cl. ........................................ 360/72; 360/73; 318/603
[58] Field of Search .................... 360/72, 73; 318/601, 318/603, 618

[56] References Cited

U.S. PATENT DOCUMENTS 3,967,177  6/1976  Scholten et al. ...................... 318/603

*Primary Examiner*—Robert S. Tupper
*Attorney, Agent, or Firm*—Price, Heneveld, Huizenga & Cooper

[57] ABSTRACT

The specification discloses a method and apparatus for providing speed control and rotational indexing of a disc recorder, based upon a particular use of a plurality of electrical pulses produced, for example, as the slots of a slotted wheel, axially coupled to a recording disc, pass a transducer. The primary repetition rate of pulses in response to equally-spaced slots is used for speed control of the recording disc. A secondary pulse rate occurring between two successive pulses resulting from adjacent slots with different spacing is used to establish an index pulse correlated with a reference point on the disc.

15 Claims, 2 Drawing Figures

COMBINED SPEED CONTROL AND SECTORING INDEX FOR DISC RECORDERS AND THE LIKE

BACKGROUND OF THE INVENTION

(1) Field of the Invention

This invention relates generally to the operation of disc recorders; and, more particularly, to controlling the speed and indexing of a recording disc.

(2) Description of the Prior Art

As is known, disc recorders include a rotating, disc-shaped magnetic medium in association with a transducer head for recording and reading information on the magnetic medium. Information can be organized on the disc in a plurality of circular tracks and further divided into a plurality of pie-shaped sectors. Accordingly, a given data group is indentifiable by the track and sector in which it is located. Locating a particular data group is typically done using electrical and mechanical means. Using purely electrical means typically requires an undesirably large amount of data storage space on the magnetic medium to be devoted to location-identifying information. On the other hand, using purely mechanical means typically requires undesirably stringent physical tolerances and stability of disc rotational speeds. Accordingly, the amount of electrical coding necessary to locate a particular data group is dependent upon the accuracy with which a given point on the disc can be located and the stability of the disc rotational speed. Typical electrical means include use of a preamble and a header containing electrical coding for identifying the data group location and for synchronizing internal clocks and decoding logic.

Speed control and indexing of recording discs using two axially-coupled slotted wheels rotating about an axis common to the recording disc is known. Typically a first slotted wheel with an associated first transducer are used for speed control and a second slotted wheel with an associated second transducer are used for indexing. The first slotted wheel has equally-spaced radial slots around the circumference which activate the first transducer to produce pulses whose repetition rate is indicative of the rotational speed of the recording disc. The second slotted wheel has a single slot to activate the second transducer to produce a pulse to indicate a given circumferential location on the recording disc.

Also, it is known to have a recording disc coupled to a slotted wheel having radial, circumferentially equally-spaced slots with one slot having a different shape to provide a reference point. For example, if one slot is longer than the others, it can be used to activate a first and a second transducer while all the other slots would activate only the first transducer. As before, the second transducer can provide a reference pulse to be used for indexing and the first transducer can provide a pulse repetition rate to be used for speed control. In both of the above-described techniques two tranducers are required. One transducer is required to detect the presence of the slots used to indicate rotational speed of the recording disc and another transducer is required to detect the slot used to indicate a reference point on the recording disc.

SUMMARY OF THE INVENTION

A single transducer is associated with a single wheel having transducer exciting portions, such as, for example, slots. The wheel is rotationally coupled to a rotating means such as, for example, a recording disc, to produce output signal pulses in response to passing slots. As a result of having the slots spaced equally around the circumference of the slotted wheel except at one point where there is an increased spacing, the single transducer provides information for both controlling speed and sector indexing of the recording disc. The primary signal pulse output of the transducer is compared to a reference pulse train having a repetition rate corresponding to the pulse repetition rate produced by the slots when the recording disc is turning at a desired speed. However, the reference pulse train has an increased spacing between two pulses, or a "missing pulse", corresponding to the increased essentially double, spacing between slots on the wheel at that particular point. If the time interval between signal pulses is greater than the time interval between the reference pulses, the disc rotational speed is increased. Analogously, if the time interval between signal pulses is smaller than the time interval between the reference pulses, the disc rotational speed is decreased. Further, a time interval between adjacent signal pulses exceeding a given amount indicates a missing pulse and is used to establish a circumferential reference point on the disc corresponding to the signal pulse following the interval, termed an "index pulse". All sectors on the disc can be located with respect to the index pulse and its associated reference point on the recording disc.

Because only one transducer, instead of two, is required to provide information for controlling speed and indexing of a recording disc, there is a cost saving. This is considerably more significant than the mere use of the transducer itself, even though that in itself is significant, since prior art devices using two transducers not only have the additional cost of the second transducer but also the additional cost of all of the associated reading and processing circuitry and components, as well as the additional cost of fabrication and assembly.

In addition, the present invention also recognizes that detecting a "missing pulse" for indexing is a simpler and less expensive solution than detecting a pulse which has been added to a train of equally-spaced pulses. First, there is the saving of the fabrication cost required to insert the additional slot in the wheel, or indeed, an entire additional wheel. Second, a higher pulse repetition rate, and therefore a greater accuracy, is possible when the interval between all of the equally-spaced slots does not have to be sufficiently long to accommodate an intervening slot. That is, in accordance with this invention, the equally-spaced slots can be as closely spaced as a given fabrication technology, representing a chosen cost of manufacturing, permits. Third, generating a reference pulse train with a missing pulse and detecting the missing pulse to establish a reference point is generally less expensive and less complex than generating and detecting an additional pulse to be inserted into a reference pulse train. This is particularly true if a phase difference, i.e., a noncoincidence of pulses, between the reference pulse train and the signal pulses is used to generate an error signal for speed control because any mislocation of the additional pulse would create an error signal.

DETAILED DESCRIPTION OF THE PREFERRED EMBODIMENT

Figure 1:
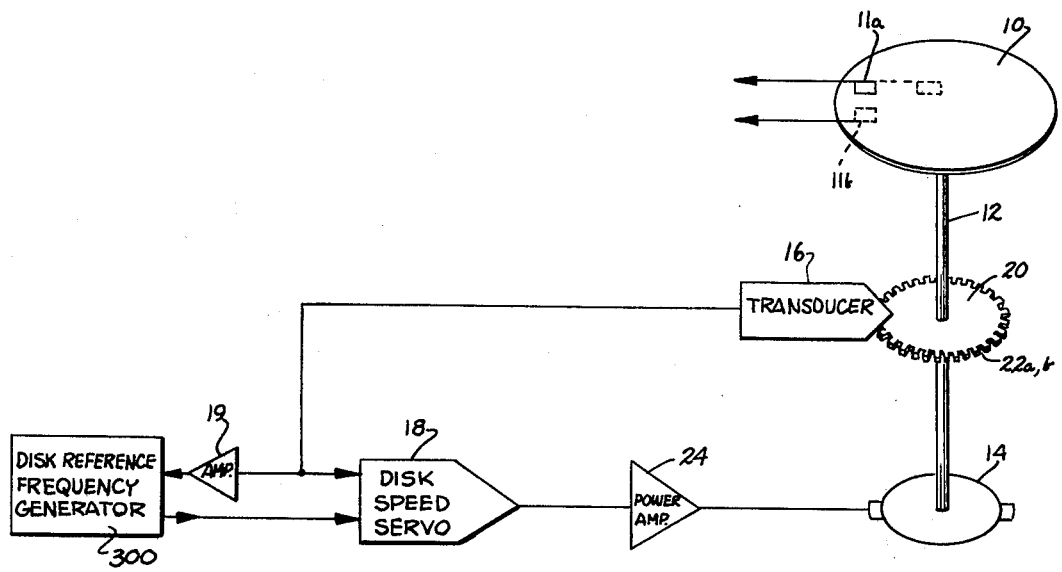
FIG. 1 is a pictorial block diagram in schematic form, showing a portion of a disc recorder in accordance with an embodiment of this invention.

Referring to FIG. 1, a recording disc 10 and a slotted wheel 20 are rotationally driven about a common axis 12 by a drive motor 14 controlled to provide a desired rotational speed. Recording disc 10 may be a conventional component, for example, a flat, circular member, typically aluminum, coated with a magnetic recording material. A transducer head 11a and a transducer head 11b are located on opposite sides of recording disc 10, in spaced relation thereto, and move radially with respect to the disc to read and to write, i.e., record or reproduce, information on the disc. Slotted wheel 20 is made of a magnetic material and has a disc shape, with a plurality of radial slots 22, i.e., 22a, 22b, 22c, et seq., extending inwardly from the perimeter. In a preferred embodiment, slotted wheel 20 has 100 equally-spaced locations around its perimeter and has slots 22, having equal width, at 99 of those 100 locations. The remaining location does not have a slot and is the location of the "missing slot" or "missing pulse". The slots adjacent to the "missing slot" can be considered to be a reference pair because they can be used to establish a circumferential reference point on the recording disc.

A transducer 16, which may be conventional commercially-available element, is positioned to detect changes in magnitude of a magnetic field, caused by the rotation of slotted wheel 20. As wheel 20 rotates, slots 22 pass transducer 16, changing the magnetic field and causing transducer 16 to produce an electrical output pulse signal representative of the changes in the magnetic field, and thus of the passing of each slot. Transducer 16 is electrically coupled to a disc speed servo 18 and through an amplifier 19 to a disc reference pulse train generator 300, which provides a second input to the speed control servo 18. Disc speed servo 18 is, in turn, coupled through a power amplifier 24 to drive motor 14. The disc reference pulse train from generator 300 has a pulse repetition rate corresponding to the pulse repetition rate of the signal produced by transducer 16 when disc 10 is turning at the desired rotational speed for continuous operation and proper recording. Note that the disc reference pulse train from generator 300 has one longer time interval between pulses corresponding to the missing slot.

In operation, as drive motor 14 drives the recording disc 10 for normal recording operation, it also rotates slotted wheel 20, in response to which pulses are produced by transducer 16 at a repetition rate depending on the speed of rotation of slotted wheel 20. Speed servo 18 compares the repetition rate of the pulses produced by transducer 16 are the repetition rate of the pulse produced by disc reference pulse train generator 300. Speed servo 18 integrates any difference between the two repetition rates to avoid instantaneous oscillation and applies a difference or error signal to drive motor 14, thereby changing the rotational speed to reduce the magnitude of the error signal. Whenever there is a coincidence between the pulses generated by transducer 16 and the pulses generated by disc reference pulse train generator 300 is no error signal. In accordance with an embodiment of this invention, and by use of conventially available components, the speed of the recording disc can be maintained within ± 0.05% of the desired speed.

Once slotted wheel 20 is rotating at the desired speed, the missing slot location can be located by observing when the time interval between signal pulses from transducer 16 exceeds a given amount. For example, if signal pulses normally occur at 250 microsecond intervals and a 350 microsecond interval has passed without a pulse then this is the location of the missing slot and the next pulse output of transducer 16, denoted an index pulse, is used to provide a reference point on disc 10.

Figure 2:
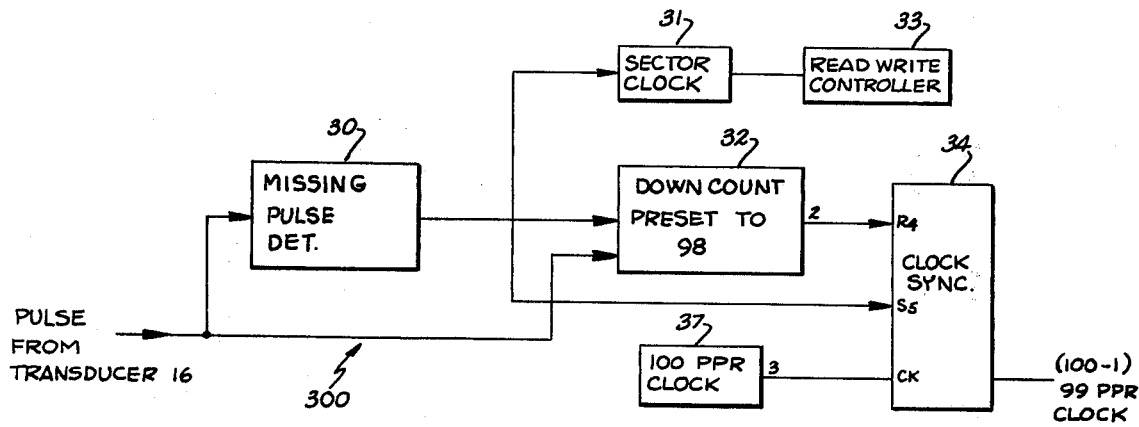
FIG. 2 is a block diagram of a portion of a circuit used to generate a reference pulse train in accordance with an embodiment of this invention.

Referring to FIG. 2, there is shown a block diagram of the circuitry within disc reference pulse train generator 300 which receives an input from transducer 16 (through amplifier 19) and an input from an internal clock 37, having a pulse repetition rate corresponding to the pulse repetition rate produced by equally-spaced slots 22 when slotted wheel 20 is at a desired rotational speed. (In the example stated above, for a wheel having 99 equally-spaced slots and 100 equally-spaced positions, the pulse repetition rate for clock 37 would be 100 pulses per each disc rotation.) In response to these inputs, pulse train generator 300 produces an output having 99 pulses (and one pulse absence, appearing where the 100th pulse would otherwise be in a pulse repetition rate of 100 per cycle) per revolution of disc 10. This corresponds to the signal pulse output of transducer 16 when slotted wheel 20 is turning at the desired rotational speed. If the disc reference pulse train has a continuous uninterrupted pulse output corresponding to the pulse repetition rate of the equally-spaced slots 22, i.e., like the 100-pulses-per-revolution clock 37, an error signal would be produced by disc speed servo 18 every time the "missing pulse" occurred in the reference by was absent in the pulse train from transducer 16. To avoid such an erroneous indication of error, every 100th pulse produced by the 100-pulses-per-revolution clock 37 is deleted from the reference frequency pulse train actually applied to the servo 18.

In the preferred embodiment, the reference pulse generator 300 includes a "missing pulse" detector 30 with an input coupled to the signal pulse output of transducer 16 and an output, providing an index pulse, coupled to an input of a counter 32, which has another input coupled to the signal pulse output of transducer 16. Counter 32 produces an output pulse after a given number of pulses have been applied to it, such output being coupled to a clock synchronizer 34 which removes pulses from an applied pulse train (e.g., the pulse train output from clock 37). Clock synchronizer 34 also has an input coupled to the 100-pulses-per-revolution clock 37, and another input coupled to the output of missing-pulse detector 30. The output of clock synchronizer 34 is the desired 99 pulses per revolution reference pulse train which is applied to disc speed servo 18. An example of an embodiment of clock synchronizer 34 is an integrated circuit made by Texas Instrument Co., designated model number 74120.

Missing-pulse detector 30 can have any of numerous circuit embodiments. For example, a one-shot multivibrator can be set to have an output whenever the time interval between signal pulses produced by transducer 16 exceeds the time interval between pulses normally produced by the transducer in response to passage of the equally-spaced slots 22. Alternatively, a four bit binary (i.e., sixteen) counter triggered by a high frequency clock can be used. In this case, each signal pulse resets the binary counter to zero and the triggering clock frequency is such that the binary counter is able to count to sixteen and produce an output only when the time interval between two successive signal pulses exceeds the normal time interval between successive signal pulses produced by the transducer in response to each equally spaced slot 22.

In operation, missing-pulse detector 30 only produces a pulse output, which constitutes the index pulse, in coincidence with the first pulse produced by transducer 16 after the "missing pulse". This index pulse sets counter 32 which is to count 99 positions if, as in the preferred embodiment, there are 99 slots around slotted wheel 20. For example, if counter 32 counts zero then it is set to 98, to have 99 countable positions. Each pulse generated by transducer 16 applied to counter 32 causes a count down of one digit in counter 32. When 99 positions have been counted, counter 32 applies an output pulse to clock synchronizer 34. The output of clock synchronizer 34 is the same as the output of clock 37 (100 pulses per revolution) until the applied pulse from counter 32 initiates an elimination of pulses, whereupon there is no pulse output from clock synchronizer 34. However, only one pulse is eliminated from the output of clock synchronizer 34 because an index pulse input, occurring at the next pulse position after the "missing pulse", operates on clock synchronizer 34 to stop eliminating pulses from the output of the 100-pulses-per-revolution clock 37. As a result, the output of clock synchronizer 34 is a series of pulse trains each having 99 equally-spaced pulses per revolution of disc 10, with a longer pulse separation occurring at the end, after the 99th pulse and the first pulse of the next train, i.e., at the time that transducer 16 detects the missing slot. There is no speed error generated by disc speed servo 18 when the missing slot passes by transducer 16, because the corresponding pulse from the reference pulse train produced by generator 300 has also been eliminated.

Referring again to FIG. 2, the output of missing-pulse detector 30 is also coupled to a sector clock 31, which is in turn coupled to a read/write controller 33. Sector clock 31 begins producing a sector pulse train when it receives an index pulse from missing-pulse detector 30. The sector pulse train has equally-spaced pulses with a time interval between pulses set to equal the time for one sector on recording disc 10 to pass transducers 11a and 11b when recording disc 10 is rotating at the desired speed. Read/write controller 33 enables reading or writing of data when the number of sector pulses received indicates that a desired sector on recording disc 10 has reached transducer heads 11a and 11b. Since the index pulse occurs once during every rotation of recording disc 10, any deviation from the desired speed of rotation of recording disc 10 produces a positional error which persists during only one rotation, and is non-cummulative. In effect, sector clock 31 and read/write controller 33 provide a synchronization of the read/write function of the disc recorder with the physical rotational position of information on recording disc 10 relative to transducer heads 11a and 11b. Advantageously, the preamble portion of the written data in a given sector is sufficiently long so that even with a worst case of deviation of rotational position, transducer head 11 will still be positioned on the preamble portion of the sector when sector clock 31 indicates that the sector has been reached and no subsequent data-containing information in the sector is lost. That is, transducer heads 11a and 11b will pass over all subsequent data in the given sector.

Various modifications and variations will no doubt occur to those skilled in the art to which this invention pertains. For example, the physical arrangement of components may be varied from that disclosed herein. Similarly, the shape and frequency of the slots may be varied from that disclosed herein, as may some of the electronic componentry illustrated or described in conjunction with the drawings. Although this invention has been described in conjunction with a disc recorder, it can be used in other applications where controlling speed and position is advantageous. These and all other variations which basically rely on the teachings through which this disclosure has advanced the art are properly considered within the spirit and broader aspects of this invention.

The embodiments of the invention in which an exclusive property or privilege is claimed are defined as follows:

1. A control means for controlling the rotational speed and position of an axially rotating means comprising:
   a wheel rotationally coupled to said rotating means and having a plurality of circumferentially spaced portions for indicating rotational speed and position of said wheel, the spacing between all of said portions except at least one reference pair being equal and less than the spacing between said reference pair, the second pulse of said reference pair being denoted an index pulse and corresponding to a particular angular position of the rotating means during its rotation;
   a transducer means disposed in transducing relation to said wheel for detecting the passing of said spaced portions as said wheel rotates and generating a signal output indicative of the repetitive passing of said portions, for use in speed control of said rotating means, said signal output comprising a pulse train with the time intervals between pulses having the same relative proportions as the spacings of said portions around said wheel;
   a disc reference pulse train generator producing an electrical pulse train having pulse intervals equal to the pulse intervals of the pulse train generated by said transducer when said wheel is rotating at a particular speed;
   a disc speed servo means having inputs coupled to said disc reference pulse train generator and to said transducer for comparing the pulse repetition rate of the signal output produced by said transducer in response to said portions which have equal spacing with the pulse repetition rate of said disc reference pulse train generator to develop an output error signal proportional to the difference between such two pulse repetition rates;
   a drive motor means electrically coupled to said disc speed servo means and rotationally coupled to said rotating means for changing the speed of said rotating means in response to said output error signal, thereby reducing said output error signal; and
   a disc-sector servo means having an input coupled to said transducer for detecting said index pulse and determining the rational position of said rotating means.

2. A control means as recited in claim 1 wherein the spacing between the portions in said reference pair is substantially equal to twice the spacing between those portions having equal spacing.

3. A control means as recited in claim 2 wherein said disc reference pulse train generator comprises:
   a missing-pulse detector means having an input coupled to the output of said transducer and a detector means output, said detector means producing an output signal and said detector means output having an index pulse occurring substantially coincident with the second signal pulse produced by said transducer in response to said reference pair of portions;
   a counter means having a first input coupled to said detector means output, a second input coupled to the output of said transducer, and an output, said counter means being adapted to register a number representing the number of portions in said wheel in response to a pulse at its said first input, to decrement by one the registered number in response to each pulse at its said second input and to produce an output pulse when said counter has been decremented a number of times equal to the number of said portions;
   a clock means for producing an output train of pulses with a repetition rate equal to the pulse signal output of said transducer in response to said equally-spaced portions when said wheel is rotating at said particular speed; and
   a clock synchronizer means having an input coupled to said counter means output, an input coupled to said pulse detector output, an input coupled to said clock means output, and an output, said clock synchronizer means having no output pulse signal during the time subsequent to the occurrence of a pulse at its input coupled to the counter means and prior to the occurrence of a pulse at its input coupled to the pulse detector but having an output pulse signal coincident with the input from said clock means subsequent to the occurrence of a pulse at its input coupled to the pulse detector prior to the occurrence of a pulse at said input coupled to the counter means.

4. A control means as recited in claim 3 wherein said rotating means includes a recording disc adapted to rotate about its axis and record information, and a read/write head disposed proximate to said recording disc for reading and writing information on said recording disc further comprising:
   a sector clock means having an input coupled to said missing-pulse detector output, for generating an output pulse train of equally-spaced sector pulses with a time interval between pulses directly proportional to the time interval for a sector unit of said disc to pass said read/write head at said particular speed of rotation, the first pulse of said sector pulse train occurring substantially coincident with said index pulse; and
   a read/write controller means having an input coupled to the output of said sector clock generating means for determining the circumferential position of disc sector units relative to said read/write head when said index pulse occurs and controlling the reading and writing of information on particular ones of said sector units as the same pass by the head.

5. A control means as recited in claim 4 wherein said disc speed servo includes integration means for integrating said output error signal during an interval including a plurality of signal pulse outputs from said transducer to reduce instantaneous oscillation of the magnitude of said output error signal.

6. A control means as recited in claim 5 wherein:
   said wheel is disc-shaped and made at least in part of a magnetic material;
   said proportions are a plurality of openings in said wheel, extending inward from the perimeter of said wheel; and
   said transducer means includes a coil magnetically coupled to the perimeter of said wheel for producing an electrical signal output in response to the changing magnetic field produced by rotation of said wheel past said transducer.

7. A disc recorder comprising:
   a recording disc for recording information in equal pie-shaped sector units of the disc while rotating about its axis;
   a read/write head sequentially disposed in transducing relation to successive sector units of said recording disc for reading and writing information on said recording disc sectors;
   a disc-shaped slotted wheel rotationally coupled along its axis to said recording disc axis and having a plurality of circumferentially spaced slots for indicating rotational speed and position of the slotted wheel, the spacing between all of the slots except a reference pair of slots being equal and the spacing between said reference pair being substantially twice the spacing between slots having equal spacing, said slots being a plurality of openings in said slotted wheel extending radially inward from the perimeter of said slotter wheel;
   a transducer means including a sensing coil magnetically coupled with the slotted perimeter of said wheel for producing an electrical signal output in response to the magnetic field changes produced by rotation of said slotted wheel in proximity to said coil past said transducer, said electrical signal output comprising a pulse train with the time intervals between pulses having the same relative proportions as the spacings of said slots around said slotted wheel;
   a missing-pulse detector means having a first input coupled to the output of said transducer and a first output, said detector means producing a signal and its said first output having an index pulse occurring substantially coincident with the second pulse produced by said transducer means in response to the second slot in said reference pair;
   a counter means having a second input coupled to said first output, a third input coupled to the output of said transducer, and a second output, said counter means being adapted to register a number representing the number of slots in said slotted wheel in response to a pulse at said second input, to decrement by one the registered number in response to a pulse at said third input and to produce an output pulse when said counter means has been decremented a number of times equal to the number of said slots;
   a clock means having a third output for producing a train of pulses with a repetition rate equal to the pulse signal output of said transducer in response to said equally-spaced slots when said slotted wheel is rotating at a desired speed;
   a clock synchronizer means having a fourth input coupled to said second output, a fifth input coupled to said first output, a sixth input coupled to said third output, and a fourth output, said clock synchronizer means having no output pulse signal subsequent to the occurrence of a pulse at said fourth input and prior to the occurrence of a pulse at said fifth input and having an output pulse signal coincident with the input at said sixth input subsequent to the occurrence of a pulse at said fifth input and prior to the occurrence of a pulse at said fourth input;

a disc speed servo means having inputs coupled to said fourth output and said transducer for comparing the pulse repetition rate of the signal output produced by said transducer in response to said slots having equal spacing with the pulse repetition rate of said fourth output to develop an output error signal proportional to the difference between the pulse repetition rates;

a drive means electrically coupled to said disc servo means and rotationally coupled to said recording disc and said slotted wheel for changing the speed of said recording disc in response to said output error signal to reduce said output error signal;

a sector clock generating means having an input coupled to said first output for generating at an output a sector pulse train of equally-spaced pulses with a time interval between pulses substantially equal to the time interval for a sector unit to pass said read/write head at said desired speed of rotation, the first pulse of said sector pulse train occurring substantially coincident with an index pulse; and a read/write controller means having an input coupled to the output of said sector clock generating means for initiating magnetic reading and writing of information on a selected sector unit of said disc at a particular interval following the time when said index pulse occurs as a function of said sector pulse train.

8. A method for indexing rotational position of a rotating means and controlling the speed thereof, comprising the steps of:

rotationally coupling a rotary transducer device to said rotating means and conditioning said transducer device to produce electrical signal output pulses in response to rotation of said rotating means, said electrical signal output pulses including a series of regularly-spaced pulses interrupted by a reference pulse pair spaced further apart than said regular pulse spacing, the second pulse of said reference pair being denoted an index pulse and occurring at a particular position of transducer rotation corresponding to a particular angular position of the disc during its rotation;

generating a disc reference pulse train having a spacing equal to the spacing of electrical signal output pulses produced by said transducer when said rotating means is rotating at a desired speed; and comparing the signal output pulses of said transducer with the pulse output of said disc reference pulse train to generate a proportional error signal, and using the proportional error signal to maintain the speed of rotation of said rotating means at said desired speed and using said index pulse as a keying signal to determine rotational position of said rotating means.

9. A method of indexing rotation of and controlling the speed of a rotating means as recited in claim 8 wherein the step of generating a disc reference pulse train comprises:

detecting said index pulse;

appplying said index pulse to a counter to set a number in said counter equal to the number of regularly-spaced transducer pulses in each said series thereof;

applying the regularly-spaced signal output pulses of said transducers to said counter to decrement the number in said counter by one each time one such pulse occurs;

producing a first electrical output from said counter when said counter has been decremented a number of times equal to the number of said regularly-spaced pulses in a series thereof;

generating a clock output having a train of pulses with a repetition rate equal to the repetition rate of the equally-spaced pulses of said transducer when the latter is rotating at said desired speed; and deleting pulses from said clock output subsequent to the occurrence of said first electrical output from said counter and prior to the occurrence of said index pulse.

10. A method of indexing and controlling the speed of a rotating means as recited in claim 9 wherein the step of comparing the output pulse repetition rate of said transducer with the pulse repetition rate of said disc reference pulse train includes the step of integrating said error signal to adjust the speed of rotation of said rotating means over a time interval including a plurality of signal output pulses from said transducer to reduce instantaneous oscillation of the magnitude of said error signal.

11. A method of indexing and controlling the speed of a rotating means as recited in claim 8 wherein the step of using said index pulse of said reference pulse pair includes the steps of:

applying said index pulse to a sector clock generating means for initiating the generation of a sector pulse train of equally-spaced pulses with a time interval between pulses correlated to the time interval for a predetermined sector of a recording disc in a disc recorder to pass a read/write head at said desired speed of rotation; and applying said sector pulse train output to a read/write controller for determining the circumferential displacement of said recording disc relative to said read/write head and initiating magnetic reading or writing of information on a particular sector unit of said recording disc as the same rotates.

12. A method of indexing the rotational position of a rotating recording disc, including the steps of producing a sequence of recurring signals in synchronism with each rotation of the recording disc, said signal sequence characterized by having a plurality of signal recurrences at particular spacings during each revolution of the disc and by at least one absence of a signal recurrence having a duration longer than the said particular spacings of the signal recurrences during other portions of the signal sequence; detecting the said absence of signal recurrence during each disc revolution and producing an index signal therefrom; and using said index signal as an index of instantaneous disc rotational position to record data on the disc at particular positions thereon relative to said index as a reference.

13. The method of claim 12 wherein said absence of signal recurrence is produced as an absent pulse in an otherwise progressive continuing sequence of pulses.

14. The method of claim 13 wherein said absent pulse is produced by detecting a pulse in a regular pulse train.

15. The method of claim 12 wherein said index signal is used to successively trigger a counting sequence whose counts represent a particular increment of angular displacement of the disc.

* * * * *

UNITED STATES PATENT AND TRADEMARK OFFICE
CERTIFICATE OF CORRECTION

PATENT NO. : 4,146,910
DATED : March 27, 1979
INVENTOR(S) : Theodore A. Oliver and Neal E. Foxworthy It is certified that error appears in the above-identified patent and that said Letters Patent are hereby corrected as shown below:

Column 1, line 18:

"indentifiable" should be --- identifiable ---;

Column 3, line 57:

"are" should be --- and ---;

Column 3, line 58:

"pulse" (1st occurrence) should be --- pulses ---;

Column 5, line 55:

"cummulative" should be --- cumulative ---;

Column 8, line 6:

"proportions" should be --- portions ---;

UNITED STATES PATENT AND TRADEMARK OFFICE
CERTIFICATE OF CORRECTION

PATENT NO. : 4,146,910                          Page 2 of 2

DATED : March 27, 1979

INVENTOR(S) : Theodore A. Oliver and Neal E. Foxworthy

It is certified that error appears in the above–identified patent and that said Letters Patent are hereby corrected as shown below:

Column 8, line 32:

"slotter" should be --- slotted ---;

Column 10, line 4:

"transducers" should be --- transducer ---.

Signed and Sealed this

Eleventh Day of December 1979

[SEAL]

*Attest:*

SIDNEY A. DIAMOND

*Attesting Officer*        *Commissioner of Patents and Trademarks*